Feb. 19, 1924.  
E. LANZEROTTI-SPINA  
1,484,376  
INTERNAL COMBUSTION ENGINE  
Filed Feb. 21, 1921  
6 Sheets-Sheet 1

INVENTOR.  
Ettore Lanzerotti-Spina  
By  
Attorney.

Feb. 19, 1924.

E. LANZEROTTI-SPINA 1,484,376

INTERNAL COMBUSTION ENGINE

Filed Feb. 21, 1921     6 Sheets-Sheet 2

INVENTOR.
Ettore Lanzerotti-Spina.
by
Attorney.

Patented Feb. 19, 1924.

1,484,376

UNITED STATES PATENT OFFICE.

ETTORE LANZEROTTI-SPINA, OF LONDON, ENGLAND.

INTERNAL-COMBUSTION ENGINE.

Application filed February 21, 1921. Serial No. 446,624.

*To all whom it may concern:*

Be it known that I, ETTORE LANZEROTTI-SPINA, a subject of the King of Italy, residing at 14 Leonard Place, High Street, Kensington, London, W. 8., England, have invented new and useful Improvements in Internal-Combustion Engines, of which the following is a specification.

The subject of this invention is an improved construction of internal combustion engine, and particularly an improved formation of the cylinder head and combustion chamber, an improved disposition of the valves and valve stems and inlet and outlet passages, and a simplified valve operating mechanism.

The cylinder head is convex and preferably spherical on its inner surface; and the valves are arranged in a ring with their valve stems inclined; for instance projecting radially from a spherical or substantially spherical zone in the head. Admission and exhaust valves alternate singly or in groups; and the inclination of their stems together enables all the valves to be operated by two levers, one for the admission and one for the exhaust valves. Vertical inlet and outlet passages are formed in the head extending from the valve openings to the flat top of the head.

Constructions according to the invention are illustrated in the accompanying drawings in which Figures 1 and 2 are sectional elevations at right angles of one construction the sections being taken on lines I—I and II—II respectively of Figure 4, while Figures 3 and 4 are plan views of this construction, Figure 3 showing a modified arrangement of the valves.

Figure 11:
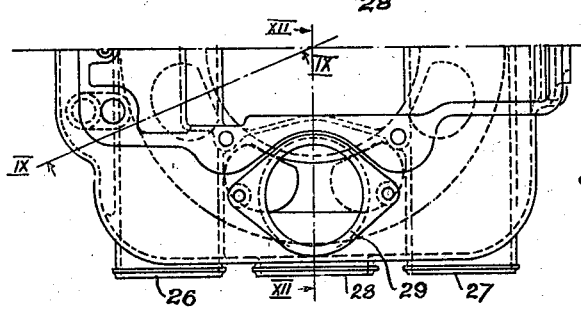

Figure 11 a plan, and

Figure 12:
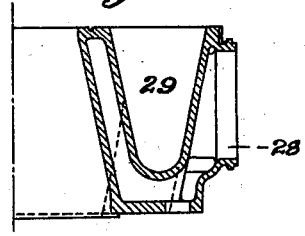

Figure 12 a section on the line XII—XII of Figure 11 of this construction.

Figure 1:
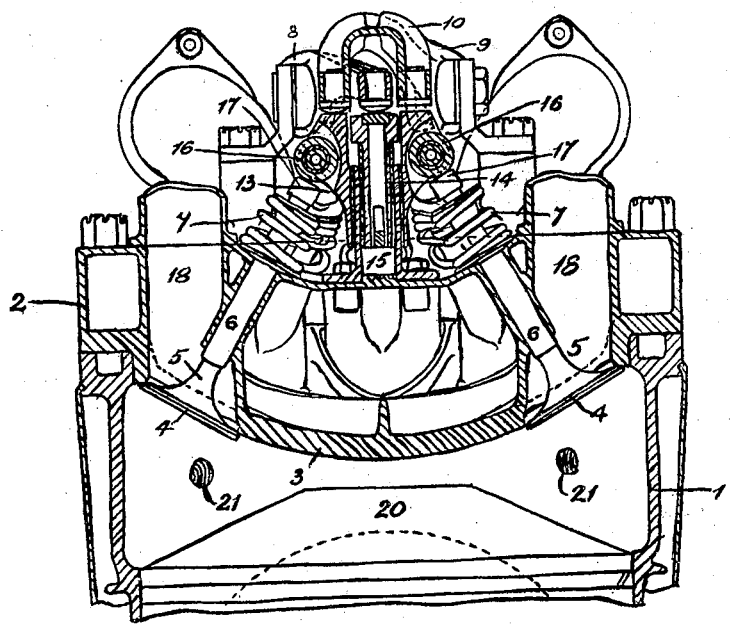
Figure 2:
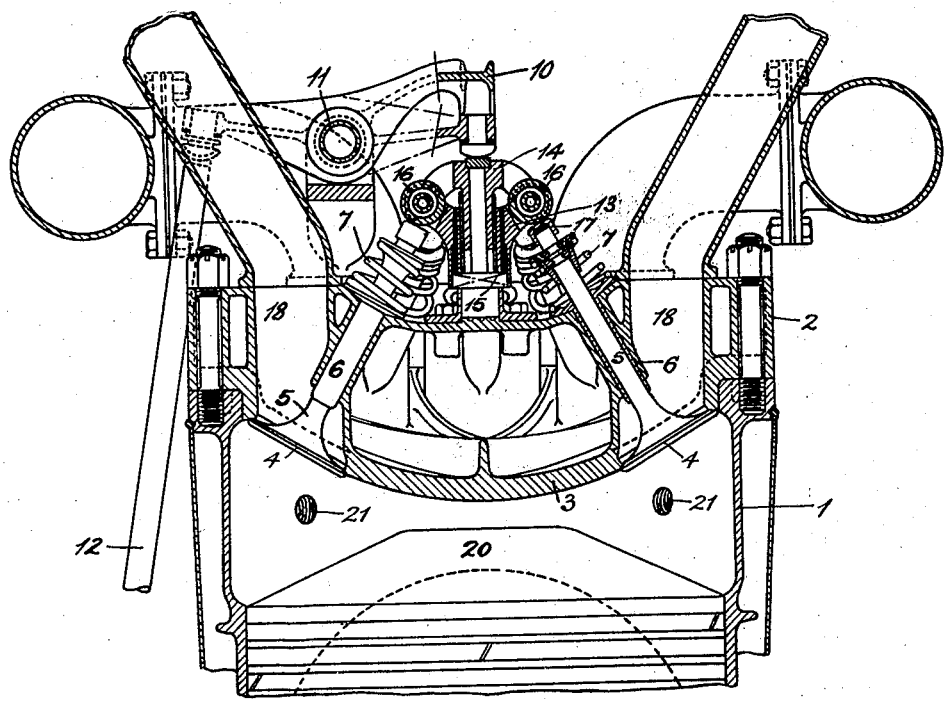
Figure 3:
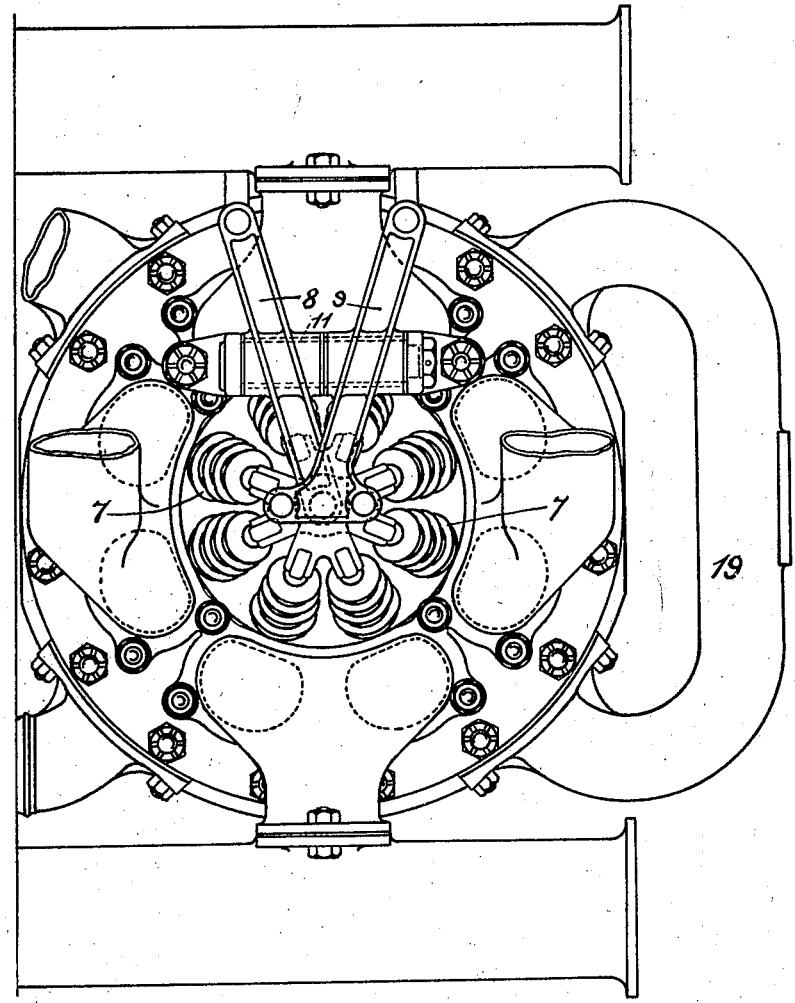
Figure 4:
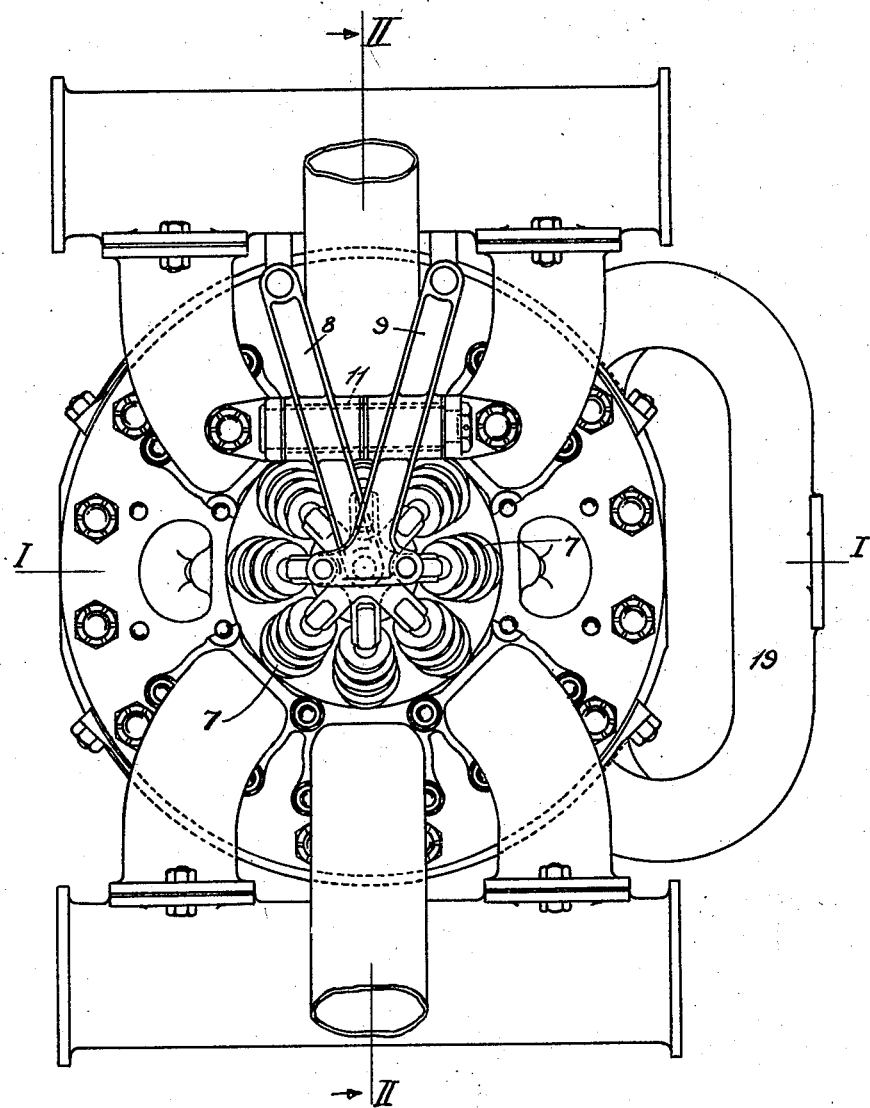

In the construction of Figures 1 to 4 the cylinder 1 is shown as fitted with a separate head 2 secured by bolts in well-known manner. The interior surface 3 of this head is convex and preferably spherical. A plurality of admission and of exhaust valves is employed, especially for cylinders of large size. These valves 4 may be arranged in various ways; for instance in one or more rings, with or without a valve in the centre. In the construction of Figures 1 to 4 they are in a single ring near the periphery of the head. Their valve stems 5 are inclined; for instance, they may project radially from the spherical inner surface of the head or from a spherical (Figure 8) or substantially spherical (Figure 6) zone formed on that inner surface, in case the whole surface is not spherical. The valve stems move in inclined guides 6. The valves are pulled upon their seatings by springs 7, and are depressed and opened by levers 8, 9 respectively, each of which operates, say, one half the valves. In Figure 3 the lever 8 operates the lowermost pair and uppermost pair of valves in that figure, while the lever 9 operates the pair to the right and the pair to the left. In Figure 4 the admission and exhaust valves alternate singly, instead of in pairs or larger groups, so that the lever 9 operates the uppermost and lowermost valves in that figure and also the valves to right and left, all of which are exhaust valves, while the lever 8 operates the alternate admission valves. It will be seen that the end 10 of the lever 9 is arched so that the lever 8 may extend through the arch. The levers rock upon a common pivot 11 and may be operated directly from an overhead cam shaft, or by vertical push rods, such as 12, from a cam shaft suitably disposed in the crank casing or elsewhere. They act upon the valve stems 5 through vertical sliding plungers 13, 14, one fitting inside and one outside the vertical hollow guide 15. Each plunger carries a number of rollers 16, one for each valve stem, and the valve stems terminate in caps 17, which afford a broad enough surface for the rollers 16 to bear upon in all positions of the valve, and also give a means for adjustment by the insertion of metal shims between the cap and the end of the stem. The inlet and outlet passages 18 extend vertically from the valve openings to the flat top of the head 2, and are there connected with suitable manifolds, for instance in such fashions as are indicated in Figures 3 and 4. The whole of the head is water cooled, the pipes 19 being water connections.

Alternatively the plungers may be operated directly or through tappets by cams on a suitably disposed cam shaft.

The alternation of admission and exhaust valves, either singly or in groups, ensures that the cooling effect of the incoming gases, and the heating effect of the outgoing gases, shall be fairly evenly distributed over the head. The inclining of the valve stems towards one another on the outside of the cylinder facilitates their operation from a central mechanism which conduces to a design of small overall dimensions. Further, this inclined arrangement, together with the location of the valves near the periphery of the head, presents the advantage that if a valve stem or valve spring breaks the valve descends only a little further than in its normal opening and then remains supported clear of the piston by the wall of the cylinder and the lower end of its stem guide. The vertical arrangement of inlet and outlet passages also conduces to a design of small overall dimensions; and in the case of a cast head makes a comparatively simple casting.

These vertical passages may be used with heads of other than convex or hemispherical form; in fact in any case in which the valve stems are sufficiently inclined, whether towards the centre or outwards.

If with a cylinder head of this form there is used a domed piston, such as is indicated at 20, the combustion chamber or compression space becomes substantially annular in form, and results in the production of a core of hot gases of annular form and of more or less pear-shaped cross-section. Sparking plugs are inserted laterally at the top of the cylinder as through the plug holes 21. It is not, however, essential to employ a domed piston; for some purposes it may be convenient to have the piston dished and more or less conforming to the general curvature of the head, as indicated in Figure 8.

Figure 5:
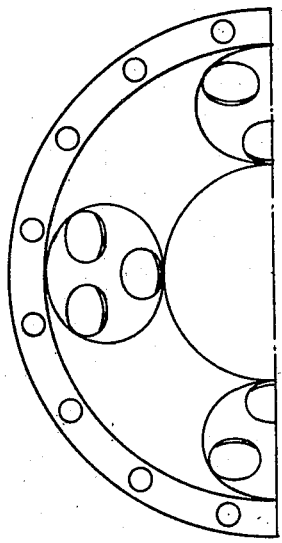
Figures 5 and 6 are a diagrammatic plan from underneath and sectional elevation of a further modified disposition of the valves, and Figures 7 and 8 similar views of yet another disposition.
Figure 7:
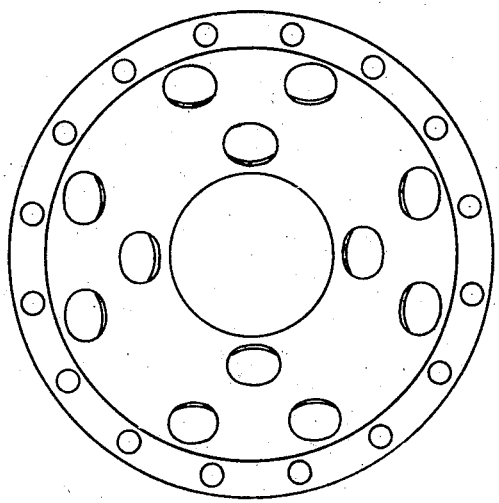
Figure 6:
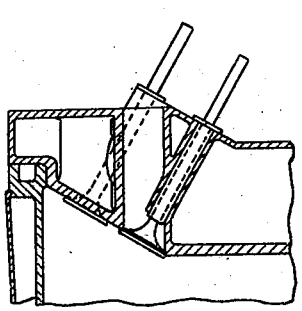
Figure 8:
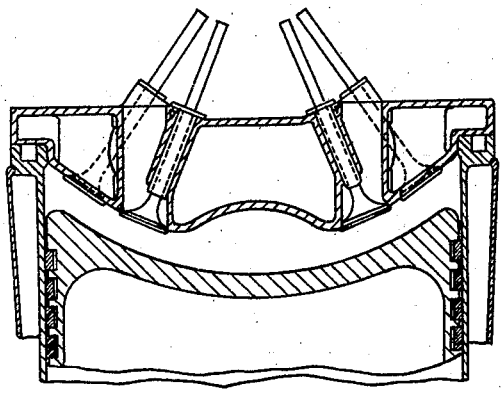

For large engines it may be convenient to subdivide the valves in the fashion shown in Figures 5 to 8. In Figures 5 and 6 the valves are arranged in groups of three, each group seating upon a flattened surface formed upon a substantially spherical zone. The valve stems of the three valves in one group are parallel with each other, but the respective groups of stems converge as before. In Figures 7 and 8 there is the same sub-division of the valves into groups of three, but these are all set radially in a spherical zone, so that all their valve stems converge.

It is convenient to provide in each cylinder head segments of manifolds communicating with the vertical passages to the valves and terminating at the sides of the cylinder in position to make joint with corresponding segments in an adjacent cylinder. Figures 9 to 12 show an example of such a construction for the inlet manifolds. In addition to the convex head 22 there is a casting 23 which is made up of the manifold segments, their junctions to the vertical valve passages, their water jacket, and an oil space. The oil space includes the space within which the valve stems and their operating plungers are placed. It is closed at the top by a cover plate 24 which also covers in the valve operating levers; and is connected by a pipe 25 with the crank casing, so that the valve mechanism is kept sufficiently lubricated by oil reaching the space in the form of vapour or finely divided particles. Two inlet manifolds are indicated at 26 and 27 and their water jacket space at 28. One exhaust manifold is indicated at 29; it will be seen that it communicates with the two lowermost valves in Figure 11 and opens on the upper surface of the casting. The two uppermost valves will similarly communicate with the second exhaust manifold and the remaining four valves of the outer ring with one or other inlet manifold 26 or 27.

Figure 9:
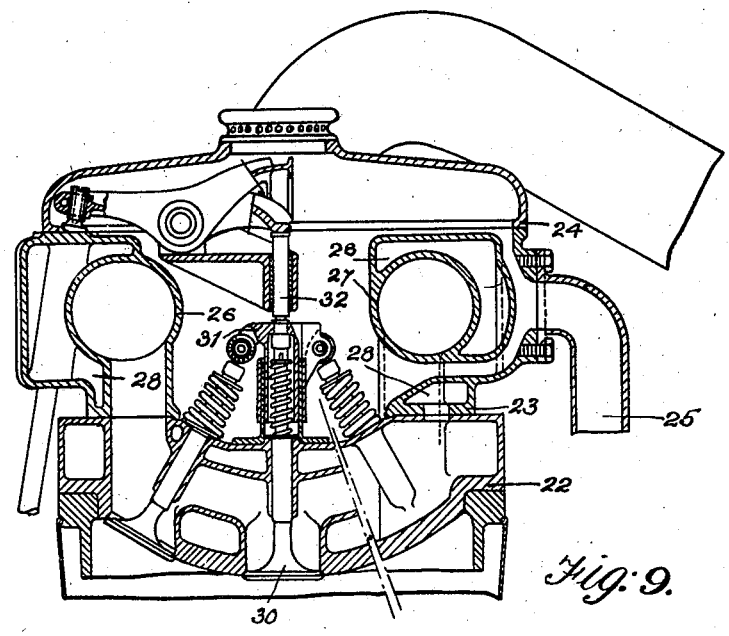
Figure 9 is a vertical section in part substantially on the line IX—IX and in part substantially on the line IX—IX' of Figure 11 of a preferred construction of inlet and outlet passages and a modified arrangement of valves.
Figure 10:
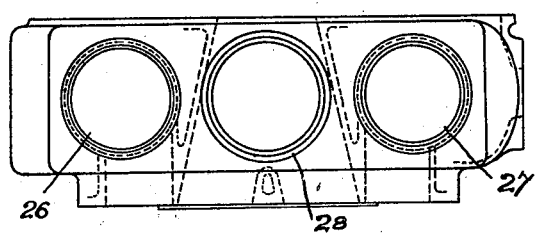
Figure 10 is an end elevation.

Figure 9 also shows how a valve may be disposed centrally in the head. In the construction illustrated the centre valve 30 is one of the inlet valves and communicates with the manifolds 26 and 27. But such a centre valve can be either an exhaust or an inlet valve and if desired there may be a single large central valve for inlet, say, and a ring of valves for exhaust. In the figure the central valve is operated by the same plunger 31 as operates the remaining inlet valves. In case it were the only inlet valve it could obviously be operated direct from its rocking lever or from an overhead cam shaft, with or without the interposition of a tappet such as 32.

What I claim is:

1. In an internal combustion engine the combination of a cylinder, a head, valves in said head numbering at least three evenly spaced around said head, said valves having their stems converging together towards the outside of the cylinder so that their ends are in close proximity, and mechanism for operating said valves.

2. In an internal combustion engine the combination of a cylinder, a head, a plurality of valves in said head moving in planes containing the cylinder axis but inclined to one another, said valves having stems inclining together towards their outer ends, and mechanism for operating said valves.

3. In an internal combustion engine the combination of a cylinder, a head, a plurality of inlet valves, and a plurality of outlet valves in said head, all of said valves being evenly spaced in a ring around said head, said valves having stems converging together towards their outer ends, and mechanism for operating said valves.

4. In an internal combustion engine the combination of a cylinder, a head, a plurality of inlet and exhaust valves in said head having stems converging together, inlet valves alternating with exhaust valves, a plunger co-axial with the cylinder operating all of the inlet valves and a second plunger co-axial with the cylinder operating all of the exhaust valves.

5. In an internal combustion engine the combination of a cylinder, a head, a plurality of inlet and exhaust valves in said head, inlet valves alternating with exhaust valves, a plunger operating all of the inlet valves, and a second plunger operating all of the exhaust valves.

6. In an internal combustion engine the combination of a cylinder, a head having a convex inner surface, valves in said head having their stems converging together, a plunger operating upon a plurality of said valve stems, and a second plunger operating upon the remainder of the valve stems.

7. In an internal combustion engine the combination of a cylinder, a head, a plurality of inlet and exhaust valves in said head, inlet valves alternating with exhaust valves, a plunger operating all of the inlet valves, and a second plunger concentric with the first operating all of the exhaust valves.

8. In an internal combustion engine the combination of a cylinder, a head having a convex interior surface, at least three ports in said head within the area of the projection of the cylinder bore upon said head, valves closing said ports having their stems substantially at right angles to the interior surface of said head, and mechanism for operating said valves.

9. In an internal combustion engine the combination of a cylinder, a head having ports within the diameter of the cylinder, valves in said head closing its ports and having their stems inclined to the axis of the cylinder, and passages in said head extending from said ports parallel with the axis of the cylinder.

10. In an internal combustion engine the combination of a cylinder, a head having a convex inner surface, valves in said head having their stems converging together, a member operating upon a plurality of said valve stems, and a second member operating upon the remainder of the valve stems.

11. In an internal combustion engine the combination of a cylinder, a head having ports within the diameter of the cylinder, valves in said head closing its ports and having their stems inclining together towards the outer ends, and passages in said head extending from said ports and opening upon the top of said head around said valve stems.

12. In an internal combustion engine the combination of a cylinder, a head having ports within the diameter of the cylinder, valves in said head closing its ports, straight passages extending from said ports parallel with the cylinder axis to the top of the head and valve stems inclined to the axis of the cylinder and passing through the lateral wall of said passages.

In testimony whereof I have signed my name to this specification.

ETTORE LANZEROTTI-SPINA.